(12) United States Patent
von Drakk

(10) Patent No.: US 11,151,112 B2
(45) Date of Patent: Oct. 19, 2021

(54) CORRELATING MULTIPLE TABLES IN A NON-RELATIONAL DATABASE ENVIRONMENT

(71) Applicant: The Von Drakk Corporation, Sheridan, WY (US)

(72) Inventor: Viktor von Drakk, Mercer Island, WA (US)

(73) Assignee: The Von Drakk Corporation, Sheridan, WY (US)

( * ) Notice: Subject to any disclaimer, the term of this patent is extended or adjusted under 35 U.S.C. 154(b) by 0 days.

(21) Appl. No.: 17/163,072

(22) Filed: Jan. 29, 2021

(65) Prior Publication Data

US 2021/0149869 A1 May 20, 2021

Related U.S. Application Data

(63) Continuation of application No. 16/390,933, filed on Apr. 22, 2019, now Pat. No. 10,922,299.

(60) Provisional application No. 62/661,831, filed on Apr. 24, 2018.

(51) Int. Cl.
*G06F 16/22* (2019.01)
*G06F 16/245* (2019.01)
*G06F 16/23* (2019.01)

(52) U.S. Cl.
CPC ...... *G06F 16/2282* (2019.01); *G06F 16/2379* (2019.01); *G06F 16/245* (2019.01)

(58) Field of Classification Search
None
See application file for complete search history.

(56) References Cited

U.S. PATENT DOCUMENTS

| | | |
|---|---|---|
| 5,987,472 A | 11/1999 | Serafin |
| 6,205,451 B1 | 3/2001 | Norcott et al. |
| 6,424,969 B1 | 7/2002 | Gruenwald |
| 6,957,225 B1 | 10/2005 | Zait et al. |
| 7,092,954 B1 | 8/2006 | Ramesh |
| 8,250,108 B1 | 8/2012 | Britton |
| 8,738,631 B1 | 5/2014 | Sacco |
| 9,165,045 B2 | 10/2015 | Mok et al. |
| 9,275,155 B1 | 3/2016 | Smith |

(Continued)

FOREIGN PATENT DOCUMENTS

| | | |
|---|---|---|
| GB | 2341250 A | 3/2000 |
| JP | 2009146084 A | 7/2009 |

OTHER PUBLICATIONS

International Search Report and Written Opinion for International Patent Application No. PCT/US2016/067362 dated Feb. 24, 2017, pp. 1-9.

(Continued)

*Primary Examiner* — Scott A. Waldron
(74) *Attorney, Agent, or Firm* — John W. Branch; Branch Partners PLLC

(57) ABSTRACT

A system, process, and method for organizing unstructured data stored in a database environment with table structure such that the data is retrievable using relational set logic, even with a database environment that does not provide relational table structures, is disclosed. The method creates, updates, and deletes database objects as necessary to describe the relationships between disparate data object types for various unique values and to provide the necessary information to retrieve the desired data objects. A device embodying and enabling the practice of the method is also disclosed.

20 Claims, 8 Drawing Sheets

(56) References Cited

U.S. PATENT DOCUMENTS

| | | |
|---|---|---|
| 9,633,074 B1 | 4/2017 | Sharma et al. |
| 9,690,820 B1 | 6/2017 | Girulat, Jr. |
| 2003/0154197 A1 | 8/2003 | Millet et al. |
| 2005/0240615 A1 | 10/2005 | Barsness et al. |
| 2006/0218136 A1 | 9/2006 | Surakka et al. |
| 2006/0222162 A1 | 10/2006 | Bank et al. |
| 2007/0083572 A1 | 4/2007 | Bland et al. |
| 2008/0140630 A1 | 6/2008 | Sato et al. |
| 2011/0161132 A1 | 6/2011 | Goel et al. |
| 2011/0307470 A1 | 12/2011 | Kamimura et al. |
| 2013/0159788 A1 | 6/2013 | Ashino et al. |
| 2013/0173664 A1 | 7/2013 | Xue et al. |
| 2013/0311425 A1 | 11/2013 | Hieda |
| 2014/0129547 A1 | 5/2014 | Sacco |
| 2014/0195476 A1 | 7/2014 | Sxhmidt |
| 2015/0039849 A1 | 2/2015 | Lewis |
| 2015/0120744 A1 | 4/2015 | Horn |
| 2015/0205885 A1 | 7/2015 | Zhou et al. |
| 2015/0317346 A1 | 11/2015 | Jakobitz |
| 2016/0125023 A1 | 5/2016 | Plasek et al. |
| 2017/0109424 A1 | 4/2017 | Oberhofer et al. |
| 2017/0177641 A1 | 6/2017 | Von Drakk |

OTHER PUBLICATIONS

Office Communication for U.S. Appl. No. 15/382,347 dated Apr. 15, 2019, pp. 1-21.
Extended European Search Report for European Patent Application No. 16876859.6 dated Aug. 6, 2019, pp. 1-9.
Office Communication for Canadian Patent Application No. 3008454 dated Apr. 24, 2019, pp. 1-6.
International Search Report and Written Opinion for International Patent Application No. PCT/US2019/028548 dated Jul. 26, 2019, pp. 1-11.
Office Communication for U.S. Appl. No. 16/601,467 dated Jan. 8, 2020, pp. 1-15.
Office Communication for Canadian Patent Application No. 3008454 dated May 5, 2020, pp. 1-4.
Office Communication for U.S. Appl. No. 16/601,467 dated Jun. 22, 2020, pp. 1-18.
Office Communication for U.S. Appl. No. 16/601,467 dated Sep. 21, 2020, pp. 1-5.
Office Communication for U.S. Appl. No. 16/390,933 dated Sep. 30, 2020, pp. 1-30.
D'Silva, Joseph Vinish et al., "Secondary Indexing Techniques for Key-Value Stores: Two Rings to Rule Them All." EDBT/ICDT Workshops (2017), pp. 1-10.
Office Communication for U.S. Appl. No. 16/601,467 dated Oct. 16, 2020, pp. 1-18.
Office Communication for U.S. Appl. No. 16/601,467 dated Mar. 3, 2021, pp. 1-13.
Office Communication for Canadian Patent Application No. 3008454 dated Mar. 1, 2021, pp. 1-3.
Office Communication for U.S. Appl. No. 16/601,467 dated Apr. 29, 2021, pp. 1-4.

S-TABLE1

| ROW # | TABLE1COL1 | TABLE1COL2 | TABLE1COL3 |
|---|---|---|---|
| 1 | DATAT1R1C1 | DATAT1R1C2 | DATAT1R1C3 |
| 2 | DATAT1R2C1 | DATAT1R2C2 | DATAT1R2C3 |
| 3 | DATAT1R3C1 | DATAT1R3C2 | DATAT1R3C3 |

S-TABLE2

| ROW # | TABLE2COL1 | TABLE2COL2 | TABLE2COL3 |
|---|---|---|---|
| 1 | DATAT2R1C1 | DATAT2R1C2 | DATAT2R1C3 |
| 2 | DATAT2R2C1 | DATAT2R2C2 | DATAT2R2C3 |
| 3 | DATAT2R3C1 | DATAT2R3C2 | DATAT2R3C3 |

S-TABLE3

| ROW # | TABLE3COL1 | TABLE3COL2 | TABLE3COL3 |
|---|---|---|---|
| 1 | DATAT3R1C1 | DATAT3R1C2 | DATAT3R1C3 |
| 2 | DATAT3R2C1 | DATAT3R2C2 | DATAT3R2C3 |
| 3 | DATAT3R3C1 | DATAT3R3C2 | DATAT3R3C3 |

FIG. 1

TABLE1

| ROW # | NAME | DOB | HAIRCOLOR |
|---|---|---|---|
| 1 | SAM SMITH | 01/09/70 | BROWN |
| 2 | SARAH JONES | 07/09/99 | BLONDE |
| 3 | PAUL WHITE | 04/05/66 | RED |

TABLE2

| ROW # | SSN | PERSNAME | GENDER |
|---|---|---|---|
| 1 | 123456789 | SAM SMITH | MALE |
| 2 | 234567890 | SARAH JONES | FEMALE |
| 3 | 345678901 | TOM BLACK | MALE |

TABLE3

| ROW # | SEX | HEIGHT | BIRTHDATE |
|---|---|---|---|
| 1 | FEMALE | 115 | 07/09/99 |
| 2 | MALE | 140 | 01/09/70 |
| 3 | FEMALE | 125 | 03/02/77 |

```
Key = "123456789"
Obj = [
{"TABLE":"TABLE2","COLUMN":"SSN"},
]
Key = "234567890"
Obj = [
{"TABLE":"TABLE2","COLUMN":"SSN"},
]
Key = "345678901"
Obj = [
{"TABLE":"TABLE2","COLUMN":"SSN"},
]
Key = "SAM SMITH"
Obj = [
{"TABLE":"TABLE2","COLUMN":"PERSNAME"},
]
Key = "SARAH JONES"
Obj = [
{"TABLE":"TABLE2","COLUMN":"PERSNAME"},
]
Key = "PAUL WHITE"
Obj = [
{"TABLE":"TABLE2","COLUMN":"PERSNAME"},
]
Key = "FEMALE"
Obj = [
{"TABLE":"TABLE2","COLUMN":"GENDER"},
]
Key = "MALE"
Obj = [
{"TABLE":"TABLE2","COLUMN":"GENDER"},
]
```

FIG. 7

Key = "123456789"
Obj = [
{"TABLE":"TABLE2","COLUMN":"SSN"}
]
Key = "234567890"
Obj = [
{"TABLE":"TABLE2","COLUMN":"SSN"}
]
Key = "345678901"
Obj = [
{"TABLE":"TABLE2","COLUMN":"SSN"}
]
Key = "SAM SMITH"
Obj = [
{"TABLE":"TABLE2","COLUMN":"PERSNAME"},
{"TABLE":"TABLE1","COLUMN":"NAME"}
]
Key = "SARAH JONES"
Obj = [
{"TABLE":"TABLE2","COLUMN":"PERSNAME"},
{"TABLE":"TABLE1","COLUMN":"NAME"}
]
Key = "PAUL WHITE"
Obj = [
{"TABLE":"TABLE2","COLUMN":"PERSNAME"},
{"TABLE":"TABLE1","COLUMN":"NAME"}
]
Key = "FEMALE"
Obj = [
{"TABLE":"TABLE2","COLUMN":"GENDER"}
]

Key = "MALE"
Obj = [
{"TABLE":"TABLE2","COLUMN":"GENDER"}
]
Key = "01/09/1970"
Obj = [
{"TABLE":"TABLE1","COLUMN":"DOB"}
]
Key = "07/09/1999"
Obj = [
{"TABLE":"TABLE1","COLUMN":"DOB"}
]
Key = "04/05/1966"
Obj = [
{"TABLE":"TABLE1","COLUMN":"DOB"}
]
Key = "BROWN"
Obj = [
{"TABLE":"TABLE1","COLUMN":"HAIRCOLOR"}
]
Key = "BLONDE"
Obj = [
{"TABLE":"TABLE1","COLUMN":"HAIRCOLOR"}
]
Key = "RED"
Obj = [
{"TABLE":"TABLE1","COLUMN":"HAIRCOLOR"}
]

FIG. 8

Key = "123456789"
Obj = [
{"TABLE":"TABLE2","COLUMN":"SSN"}]
Key = "234567890"
Obj = [
{"TABLE":"TABLE2","COLUMN":"SSN"}]
Key = "345678901"
Obj = [
{"TABLE":"TABLE2","COLUMN":"SSN"}]
Key = "SAM SMITH"
Obj = [
{"TABLE":"TABLE2","COLUMN":"PERSNAME"},
{"TABLE":"TABLE1","COLUMN":"NAME"}]
Key = "SARAH JONES"
Obj = [
{"TABLE":"TABLE2","COLUMN":"PERSNAME"},
{"TABLE":"TABLE1","COLUMN":"NAME"}]
Key = "PAUL WHITE"
Obj = [
{"TABLE":"TABLE2","COLUMN":"PERSNAME"}]
Key = "FEMALE"
Obj = [
{"TABLE":"TABLE2","COLUMN":"GENDER"},
{"TABLE":"TABLE3","COLUMN":"SEX"}]
Key = "MALE"
Obj = [
{"TABLE":"TABLE2","COLUMN":"GENDER"},
{"TABLE":"TABLE3","COLUMN":"SEX"}]
Key = "01/09/1970"
Obj = [
{"TABLE":"TABLE1","COLUMN":"DOB"}]

Key = "07/09/1999"
Obj = [
{"TABLE":"TABLE1","COLUMN":"DOB"},
{"TABLE":"TABLE3","COLUMN":"BIRTHDATE"}]
Key = "04/05/1966"
Obj = [
{"TABLE":"TABLE1","COLUMN":"DOB"},
{"TABLE":"TABLE3","COLUMN":"BIRTHDATE"}]
Key = "03/02/1977"
Obj = [
{"TABLE":"TABLE3","COLUMN":"BIRTHDATE"}]
Key = "BROWN"
Obj = [
{"TABLE":"TABLE1","COLUMN":"HAIRCOLOR"}]
Key = "BLONDE"
Obj = [
{"TABLE":"TABLE1","COLUMN":"HAIRCOLOR"}]
Key = "RED"
Obj = [
{"TABLE":"TABLE1","COLUMN":"HAIRCOLOR"}]
Key = "115"
Obj = [
{"TABLE":"TABLE3","COLUMN":"HEIGHT"}]
Key = "140"
Obj = [
{"TABLE":"TABLE3","COLUMN":"HEIGHT"}]
Key = "125"
Obj = [
{"TABLE":"TABLE3","COLUMN":"HEIGHT"}]

FIG. 9

Key = "TABLE1TABLE2SAM SMITH"
Obj = [
{"TABLE":"TABLE1","ROW#":1},
["TABLE":"TABLE2","ROW#":1}]

FIG. 10

Key = "TABLE1TABLE2SAM SMITH"
Obj = [
{"TABLE":"TABLE1","ROW#":1},
["TABLE":"TABLE2","ROW#":1}]
Key = "TABLE2TABLE1SAM SMITH"
Obj = [
{"TABLE":"TABLE1","ROW#":1},
["TABLE":"TABLE2","ROW#":1}]

CORRELATING MULTIPLE TABLES IN A NON-RELATIONAL DATABASE ENVIRONMENT

CROSS-REFERENCE TO RELATED APPLICATIONS

This Utility Patent Application is a Continuation of U.S. patent application Ser. No. 16/390,933 filed on Apr. 22, 2019, now U.S. Pat. No. 10,922,299 issued on Feb. 16, 2021, which is based on previously filed U.S. Provisional Patent Application Ser. No. 62/661,831 filed on Apr. 24, 2018, the benefit of the filing date of which is hereby claimed under 35 U.S.C. § 119(e) and § 120 and the contents of which are each further incorporated in entirety by reference.

This invention relates to a method for correlating multiple sets of collected data (stored in a plurality of tables in a database environment) quickly and efficiently even if the tables are large and/or constantly updated. The method of the invention allows searching for related information quickly and efficiently even if the tables are not actively structured, indexed, or related. The invention extends to a device which implements the method.

BACKGROUND OF THE INVENTION

The present invention relates to searching large and/or constantly-updated tables containing data for particular correlations. It is especially useful for, though not limited to, searching multiple large tables for correlated information. It will be described in the context of searching tables of network activity and information for particular correlations which may indicate attempts to penetrate secure networks, establish means to penetrate secure networks at a later time or upon the occurrence of some other event, or otherwise evade computer security protections of various types. However, the problem it addresses is an old and general one in the art, as will be set forth below.

For purposes of this application, a database management system ("DBMS") will be defined as computer software which creates an information storage environment operating on one or more general purpose or specially designed computer systems allowing the creation and manipulation of one or more digital files ("databases") containing a plurality of tables, each table containing one or more records, each record containing a plurality of fields, and each field containing some specific piece of information.

As is well known to those of ordinary skill in the art, DBMS may be considered to belong to one of two general classes: relational systems, in which tables can be actively "related" to each other at the DBMS application level by designating one or more "related" fields common to the related tables, and non-relational systems, in which no such relation can be actively maintained at the application level. (Non-relational DBMS are also referred to as "flat-file" DBMS.)

An example of a relational database would be one containing a table with a list of names and addresses, and a table containing a list of names and birthdates. If the tables were 'related' by the name fields at the application level, it would be simple to have the DBMS search for all names associated with a particular birthdate, and use the address table to automatically prepare a personalized birthday greeting including a mailing address for each related name. If the tables were not related at the application level, first all names associated with a particular birthdate would have to be searched from the birthdate table and then the address table would have to be searched for each such name and an individual personalized birthday greeting prepared.

While tables in non-relational DBMS can be manually related by choosing a suitable field from at least two tables and then performing individual operations on the tables relative to the common elements of those fields, the functionality of a relational DBMS, for purposes of this application, is part of the overhead of the computer software which creates, maintains, and accesses the DBMS. If two tables are related at the application level, the computer software will automatically maintain knowledge of the related elements, any search which involves the related tables will be made faster, and operations are supported which allow more complex manipulation of the related data with less effort on the part of the user. The tradeoff is that maintaining the relation(s) requires large amounts of resources which make the overall computer software slower and the file storage necessary greater.

Non-relational DBMS, free of the overhead of maintaining the relationships and storing information about them at the application level, can be faster and the file storage requirements can be lower. Additional efficiencies are also possible due to the lack of restrictions that relational DBMS by necessity impose on related tables.

Similarly, tables in a DBMS may be "indexed" or "non-indexed." An indexed table is one which contains at least one index field in every record, with the contents of that index field being unique to each record. (For instance, a table of items with serial numbers can use the item serial numbers as an index field, as serial numbers by definition are unique to individual items.) Indexing a table makes it faster and more efficient to sort or otherwise process in some ways, but imposes overhead, restrictions and file storage requirements which are not necessary for non-indexed tables.

It is an old problem in the art to select the parameters for the creation of DBMS such that they are relational or non-relational, and/or use indexed or non-indexed tables. Relational DBMS and indexed tables provide many advantages but as the amount of data in the table(s) as the database grows, the overhead, storage, and restrictions inherent in these features become much more burdensome. Modern network activity logs, for instance, can generate tables with millions of entries per day or even per hour, and are updated hundreds or thousands of times per second. The amount of data generated is large and the overhead associated with dynamically indexing it and maintaining relationships, if such is desired, is equally large.

It would be useful to provide a method for gaining some of the advantages that relational DBMS and/or indexed tables provide without requiring that the DBMS be actively relational and/or that the tables therein be dynamically indexed. The present invention addresses these concerns.

SUMMARY OF THE INVENTION

Among the many objectives of the present invention is the provision of a method for organizing unstructured data stored in a non-relational DBMS such that the data is retrievable using a novel application of relational set logic.

Another objective of the present invention is the provision of a method for rapidly and efficiently determining whether two or more tables contain corresponding data.

Another objective of the present invention is the provision of a method for efficiently monitoring tables containing unstructured data and performing a predetermined plurality of steps if data added to one table corresponds to data already present in another table.

Yet another objective of the present invention is the provision of a device which will automatically execute the method(s) of the invention and accept input from a user to execute the method(s) as directed by the user.

BRIEF DESCRIPTION OF THE DRAWINGS

FIG. 1 depicts a structure diagram of three tables for use with the method.

FIG. 2 depicts three tables for use with the method containing actual data.

FIG. 6 depicts a sample output comprising a first Stitch Object Table.

FIG. 7 depicts a sample output comprising a second Stitch Object Table.

FIG. 8 depicts a sample output comprising a third Stitch Object Table.

FIG. 9 depicts a sample output comprising a first Stitch Object Map Table.

FIG. 10 depicts a sample output comprising a second Stitch Object Map Table.

DESCRIPTION OF THE PREFERRED EMBODIMENTS

Figure 3:
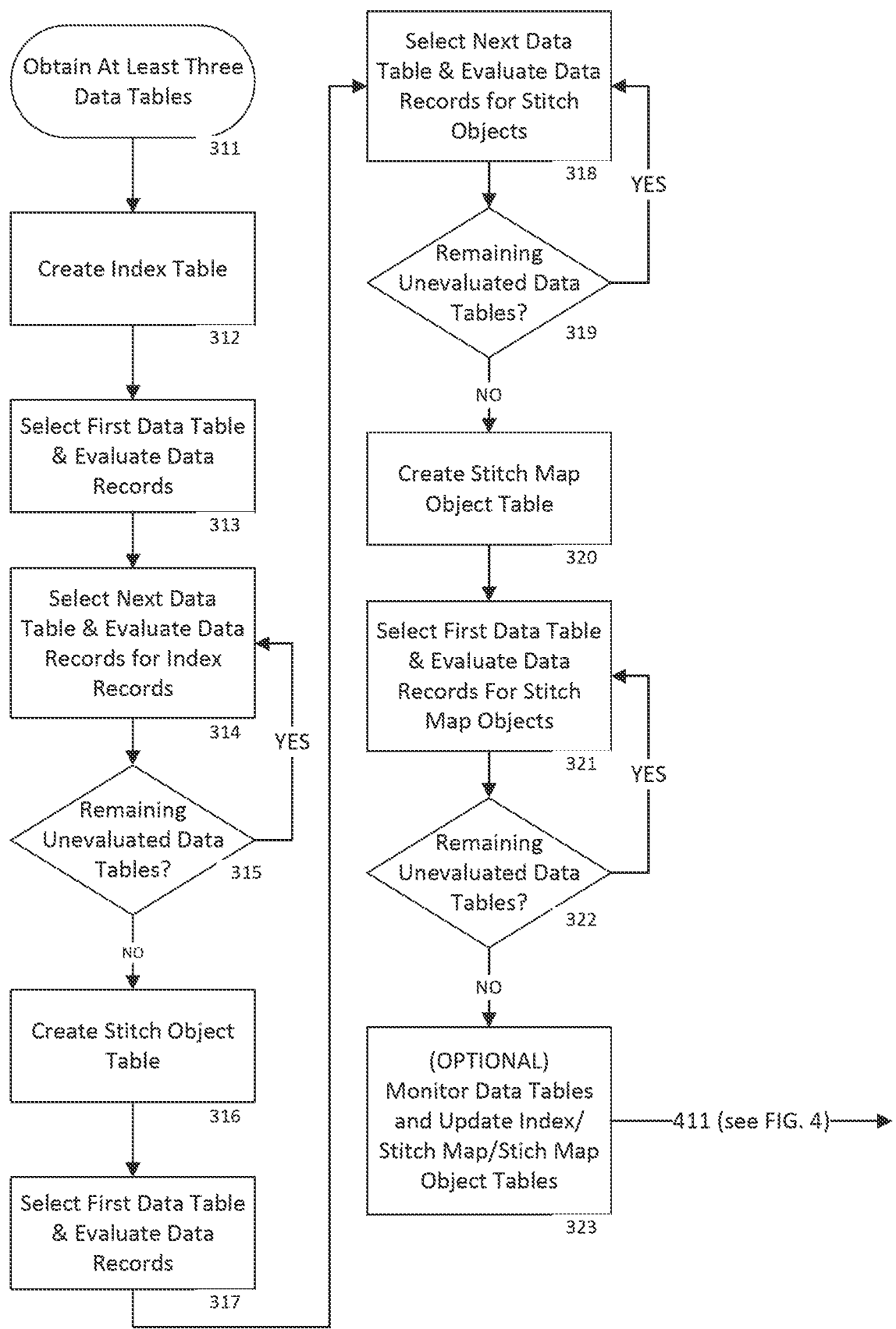
FIG. 3 depicts a flow chart of the first part of the method of the invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices. The words "combination" and "permutation" are used in this application in their set theory senses. Unless otherwise reasonably indicated by context, a "combination" is a particular grouping of the elements in a set, whose order is irrelevant. A "permutation" is a single distinct ordered grouping of the elements in a set. Assuming all elements must be selected, there can only be one combination of any particular group of elements having N elements: there are N! ("N Factorial") permutations of such a group.

For purposes of the description of the preferred embodiment(s,) a DBMS running on a single "server," or a single physical computer running a software application which provides the functionality of the DBMS, will be assumed. It is well known to those of ordinary skill in the relevant art that DBMS can be operated on "virtual" servers comprising a single instance of an operating system running contemporaneously with other instances of operating systems on a single physical computer, and/or on "clusters" comprising a plurality of actual or virtual servers, and/or that the data stored in the DBMS' database(s) may be stored on a plurality of separate servers or information storage devices which may or may not be integral to the server(s) running the DBMS software application.

Furthermore, many DBMS utilize a "client/server" configuration where some operations take place on the server running the DBMS software application and others take place on a separate computer or computers being operated by a user. Any or all of the devices involved in the configuration of the DBMS server(s) and/or clients may be physically proximate and connected remotely through wired or wireless networking, or virtually connected through the global computer network. The underlying configuration, location, and connection structure of the DBMS server(s) and/or any client computers and/or any information storage devices are irrelevant for the purposes of the invention, and any reasonable configuration desired and implemented by a person of ordinary skill in the relevant art will serve to perform the method of the invention or serve as a device for its implementation.

For purposes of the description of the preferred embodiment, a single unlimited database object, created and maintained by a DBMS running on the server, which allows for the creation of two or more tables will be assumed. Each of the tables will contain at least one record, each of which contains at least one field, each field containing a single stored piece of information. These records can comprise delimited lines in a text file, delimited objects (for example, JSON objects) in a text file, individual data objects in an appropriate digital "container," or any other desired format.

The stored pieces of information can be any desired and feasible type of information, such as text, numbers, or image data. It is optional to store pieces of information in the Index Table, the Stitch Object Table, and the Stitch Map Object Table (infra) as "hashed" values. "Hashing" a stored piece of information is an operation well known in the art, and it will not be specifically defined herein. If it is desired to be able to search non-textual data such as image data, it is optional that such non-textual data be hashed and converted to textual data (e.g. hexadecimal numbers representing pixel values) to increase the efficiency of the method of the invention.

The following tables will be assumed to be defined and, where appropriate, dynamically maintained as new information appropriate for storage within those tables becomes available. The fields defined as "included" are required, but additional fields can be added without affecting the basic operation of the method.

By referring to FIGS. 1 and 2, the basic structure of tables to which the method of the invention can be applied can be easily understood. FIG. 1 depicts a structure diagram of three tables, S-TABLE1 11, S-TABLE2 12, and S-TABLE3 13. FIG. 2 depicts three tables TABLE1 21, TABLE2 22, and TABLE3 23, having the same structure, but containing actual data. (The data shown is fictional and does not correspond to any actual person or entity.) Although no two columns of any table have the same name, each table has at least one column which stores data of the same type as is stored in a column of at least one other table. For convenience, the corresponding columns of each table have similar shading. While the example tables shown are simple, the method will work with tables of any size, and is particularly suitable for use with very large non-structured, non-relational tables such as are commonly used in the field of network activity monitoring and security, e-commerce, or financial transactions. Such tables are often stored as what are referred to as JSON files, which are large non-structured text files containing individual data records stored as text with a particular format known as name-value pairs. Each record in a JSON file has a format similar to the following:

{"$NAME1":$VALUE1, "$NAME2":$VALUE2, [ . . . ] "$NAME(n)":$VALUE(n)}

Where each $NAME(n) is the name of a column in a record, and each $VALUE(n) is the value stored in that column in that record. As a JSON file, TABLE1 21 from FIG. 2 would look like this:

[
{"NAME":"SAM SMITH","DOB": 01091970,"HAIRCOLOR":"BROWN"}
{"NAME":"SARAH JONES","DOB": 07091999,"HAIRCOLOR":"BLONDE"}
{"NAME":"PAUL WHITE","DOB": 04051966,"HAIRCOLOR":"RED"}
]

Tables stored in JSON text format are non-relational and have no enforced structure other than that of proper delimitation: it is not required that any particular record contains values, including null values, for any particular column that may be referred to elsewhere in the table. The method of the invention overcomes the lack of these properties and allows rapid and efficient searching of such tables, as will now be demonstrated.

FIG. 3 shows a flow chart of the first part of the method of the invention: specifically, indexing existing data and dynamically monitoring new data to be indexed. In STEP 311, at least three existing non-relational Data Tables are obtained. These tables can be obtained by any reasonable means, including by obtaining/requesting user input, by using previously created data to assemble the tables, or by simply referring to existing tables already created and available. They contain Data Records, which can be stored as name-value pairs or in any other reasonable format. It is required that the Data Tables not be stored by the DBMS in a relational form.

In STEP 312, an Index Table is created. The Index Table comprises a new table containing multiple Index Records, each Index Record containing the following information stored as a name-value pair:

1) Each unique data value found in the Data Tables, paired with a list of the names of every Data Table which contains that data value. It is preferred, but not required, that the data values and the names of the Data Tables are hashed. There is one Index Record for each unique data value in the Data Tables.
   OR
2) Each unique column name (name value) found in the Data Tables, paired with a list of the names of every Data Table which contains that column name. It is preferred, but not required, that the column names and the names of the Data Tables are hashed. There is one Index Record for each unique column name in the Data Tables.

In STEP 313, a first Data Table is selected, and each Data Record in that Data Table is evaluated for both any unique values which are not already stored in the Index Table, and any unique column names which are not stored in the Index Table. If a Data Record contains a unique value not yet stored in the Index Table, a new Index Record is created, which has the unique value (or its hash if hashes are being used) as a name and the name of the table (or its hash if hashes are being used) as a value. Likewise if a Data Record contains a unique column name not yet stored in the Index Table, a new Index Record is created, which has the column name (or its hash if hashes are being used) as a name and the name of the table (or its hash if hashes are being used) as a value.

If a Data Record contains a column name which is stored in the Index Table, but the unique column name associated with that Data Record is not stored in the Index Record associated with that unique column name, the unique column name is added to the existing Index Record in which the unique column name is stored.

If the information stored in the Index Table is hashed, it is required to generate a temporary hash value for each unique value and column name in the Data Record being evaluated for purposes of this evaluation and so the hashed value/column name may be added to the Index Table if appropriate.

In STEP 314, the next Data Table is selected and evaluated. In this step, if a unique value or column name is found which is already stored in the Index Table, the name of the current Data Table (or its hash) is added to the value of the corresponding Index Record. If a unique value or column name is found which is not stored in the Index Table, a new Index Record is created and populated as in STEP 313. It is optional to create a temporary list of previously evaluated unique values and column names from the current Data Table and check each evaluated Data Record against the temporary list before checking for the presence of the unique values and column names in the current Data Record in the Index Table. If the currently evaluated Data Record contains no unique values or column names not already on the temporary list, it is not necessary to search the Index Table and the next Data Record can be selected and evaluated. This step is repeated until all Data Records in the current Data Table have been evaluated.

In STEP 315, it is determined whether there are Data Tables which have not been evaluated for the creation of Index Records. (Noting that the method of the invention requires that there be at least three, so this determination will be found to be true at least once.) If so, the next un-evaluated Data Table is selected for evaluation and the method returns to STEP 314. If not, the method continues.

In STEP 316, a Stitch Object Table is created. A Stitch Object Table is a table which contains Stitch Objects. A Stitch Object is a record which contains a key-object pair, with the key being equivalent to a unique value found in at least one of the Data Tables (or its hash,) and the object being a table containing records of all Data Tables in which that unique value is found and for each such Data Table, the name of the column(s) in which that unique value can be found.

In STEP 317, a first Data Table is selected and each Data Record in that Data Table is evaluated for the creation of Stitch Objects. When a unique value is found which is not already referred to by a Stitch Object, a new Stitch Object is created and stored in the Stitch Object Table. When a unique value is found which is referred to by a Stitch Object, but which appears in a column which is not yet associated with that unique value in the Stitch Object, the name of the column is added to the Stitch Object for that unique value. It is preferred, but not required, to use hashes for both the unique values, the names of the Data Tables, and the names of the columns when storing them in Stitch Objects.

As an example of the process of STEP 317, the Stitch Objects shown in FIG. 6 would be created if STEP 317 were applied to TABLE2 in FIG. 2. Note that hashing is not being applied to make the references clearer. Also, the column "row #" is not being evaluated as it is an optional record location value, unique to each record in the table.

In STEP 318, the next Data Table is selected and evaluated for the creation of Stitch Objects. If a unique value is found which is not stored in a Stitch Object, a new Stitch Object is created and stored. If a unique value is found which is already stored in a Stitch Object, the name of the current Data Table and the column in which the unique value is stored in the current Data Table is added to the corresponding Stitch Object. It is optional to create a temporary list of previously evaluated unique values and column names from the current Data Table and check each evaluated Data Record against the temporary list before checking for the presence of the unique values and column names in the current Data Record in the Stitch Object Table. If the currently evaluated Data Record contains no unique value/column name pairs not already on the temporary list, it is not necessary to search the Stitch Object Table and the next Data Record can be selected and evaluated. This step is repeated until all Data Records in the current Data Table have been evaluated.

As an example of the process of STEP 318, the Stitch Objects shown in FIG. 7 would be found in the Stitch Object Table if STEP 318 were applied to TABLE1 in FIG. 2 after STEP 317 had already produced the results noted in the prior example. Note that hashing is not being applied to make the references clearer. Also, the column "row #" is not being evaluated as it is an optional record location value, unique to each record in the table.

In STEP 319, it is determined whether there are Data Tables which have not been evaluated for the creation of Stitch Objects. If so, the next un-evaluated Data Table is selected for evaluation and the method returns to STEP 318. If not, the method continues.

As an example of the process of STEP 319, the Stitch Objects shown in FIG. 8 would be found in the Stitch Object Table if STEP 319 were applied to TABLE3 in FIG. 2 after STEP 318 had already produced the results noted in the prior example. Note that hashing is not being applied to make the references clearer. Also, the column "row #" is not being evaluated as it is an optional record location value, unique to each record in the table.

In STEP 320, a Stitch Map Object Table is created. The Stitch Map Object Table holds Stitch Map Objects, which are key-object pairs in which the key is a unique value found in at least two Data Tables concatenated with the names of at least two Data Tables which contain that Data Table (or hashes of all of these,) and the object is a table containing records which contain a list of all combinations of columns in the correlating Data Tables (referenced in the key) which contain the unique value (referenced in the key) and at least one optional reference values (e.g. which rows in the correlating Data Tables contain the unique value.) There will be one Stitch Map Object for each combination of Data Tables which contain the referenced unique value.

In STEP 321, a Data Table is selected as the current Data Table and Stitch Map Objects are created for each unique value in the selected Data Table.

In STEP 322, a determination is made as to whether there are any Data Tables remaining which have not been evaluated for the creation of Stitch Map Objects. If so, an unevaluated Data Table is selected as the current Data Table and STEP 321 is repeated. If not, the method continues.

As an example, FIG. 9 shows a Stitch Map Object for the unique value "SAM SMITH" as referenced in all Data Tables in FIG. 2. Note that hashing is not being applied to make the references clearer. This is how the Stitch Map Object for the unique value "SAM SMITH" would appear at the end of STEP 322.

It is optional, but not required, to have one Stitch Map Object for each permutation of Data Tables which contain the referenced unique value. This increases storage and computational overhead, but allows prioritization of search of a particular permutation if this would produce a lower number of required operations to perform any particular search. FIG. 10 shows Stitch Map Objects for all permutations of Data Tables referencing the unique value "SAM SMITH" in FIG. 2. Note that hashing is not being applied to make the references clearer. This is how the Stitch Map Object for the unique value "SAM SMITH" would appear at the end of STEP 322 if this optional procedure were applied.

In optional STEP 323, the Data Tables are monitored for new entries, and/or the DBMS is monitored for the addition of new Data Tables, and the Index Table, the Stitch Map Table, and the Stitch Map Object Table are dynamically updated to include any unique values, et cetera, which may appear. This concludes the first part of the method of the invention.

Figure 4:
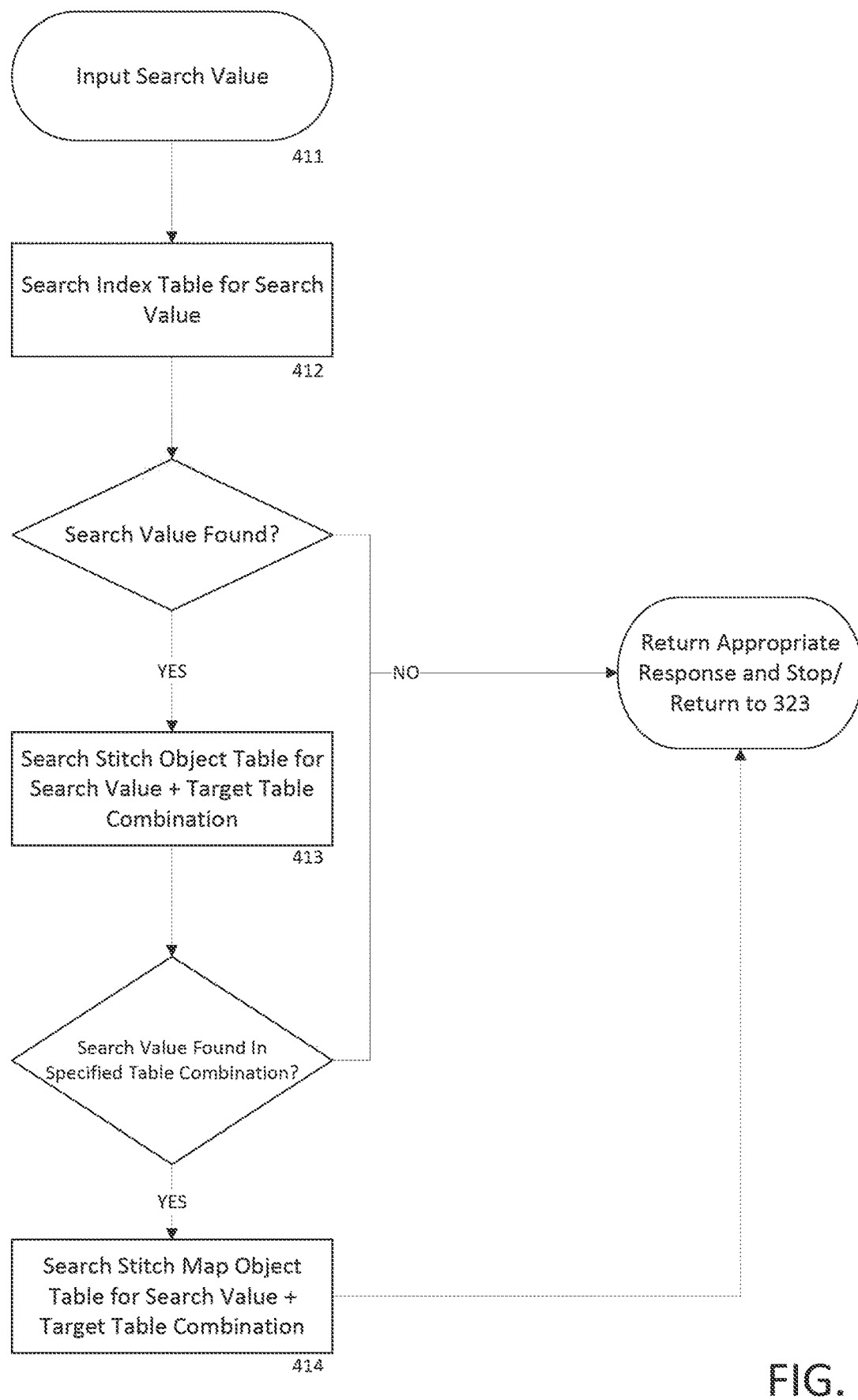
FIG. 4 depicts a flow chart of the second part of the method of the invention.

FIG. 4 shows a flow chart of the second part of the method of the invention. It will be assumed, for purposes of describing the method of the invention, that the first part of the method (See FIG. 3) has been performed in relation to the Data Tables found in FIG. 2, creating an Index Table, a Stitch Object Table, and a Stitch Map Object Table. A user wishes to determine whether a certain unique value exists such that it is found in at least two tables in corresponding columns and further, what correlating information is found in each Data Table where such unique value may be found. (For example, "NAME" in TABLE1 and "PERSNAME" of FIG. 2.) In this case, the user desires to check two names, in sequence: "PAUL WHITE," and "SAM SMITH."

In STEP 411, the user inputs the search value "PAUL WHITE."

In STEP 412, the Index Table is searched for the value "PAUL WHITE." This would return a positive result, confirming that the value is found in at least one table. If that was the entire object of the user's search, the method would provide that confirmation and then stop. It would also confirm that the value is found only in TABLE1. If a listing of Data Tables containing the value was the entire object of the user's search, the method would provide that listing and then stop. Otherwise the method would continue.

In STEP 413, the Stitch Object Table is searched for the combination of tables plus the value (or their respective hashes) which is desired. For purposes of this description of the preferred embodiment, it will be assumed that the user is searching for all records in which "PAUL WHITE" appears in both TABLE1 and TABLE2. Searching the Stitch Object Table in FIG. 8 shows that TABLE2 does not appear in the Stitch Object for "PAUL WHITE," so the method would return a negative indication and then stop. Otherwise the method would continue, as shown in the description below.

Redoing the same search for "SAM SMITH," starting with STEP 411, results in similar results until STEP 413. Since the Stitch Object for "SAM SMITH" contains both TABLE1 and TABLE2, if confirmation that "SAM SMITH" appeared in both tables under the appropriate columns (PERSNAME and NAME) was the entire object of the user's search, the method would indicate that and then stop. Otherwise it would continue.

In STEP 414, the Stitch Map Object Table is searched for the key corresponding to the combination of the desired tables and the search value ("TABLE1TABLE2SAM SMITH" or the equivalent hashed and concatenated values.) This would return the object in FIG. 9 (or, if the alternate embodiment is used, the objects in FIG. 10.) This object would then be used to generate whatever information the user has ultimately requested, including whatever data is stored in the Data Tables in the rows identified in the row identifiers included in the Stitch Map Objects corresponding to the generated key. This information can then be output to a screen or a printer in whatever format desired, as will be obvious to those of ordinary skill in the art.

To summarize the purpose of the various tables which are constructed from the Data Tables, each has the following role in the search portion of the method of the invention:

1) The Index Table exists to allow confirmation that a search value is found in the Data Tables, and if so, in which Data Tables it is found.
2) The Stitch Object Table exists to allow confirmation that a search value is found in a particular combination of Data Tables in particular columns.
3) The Stitch Map Object Table exists to allow precise identification of the records in the Data Tables which satisfy particular parameters regarding search values.

It will be obvious to those of ordinary skill in the art that the method of the invention can also be used to find correlations of sets of values present in two or more Data Tables. Instead of defining a single unique value, the user defines a target column of one or more Data Tables. (For example, "NAME" in TABLE1 of FIG. 2) STEP 411 is then iterated for each value in the target column, and all resulting matches are output as above.

Without changing the underlying method of the invention, additional steps, including but not limited to the following, could be added. The combination of the method as thus far described with the steps set forth below, even if the additional steps happen to be known in the prior art as individual actions, results in an overall method which is novel and addresses the objectives of the invention in a new and unanticipated way.

1) Since the method requires that any new data be checked for uniqueness relative to all processed Data Tables, it is trivial to notify either human beings, automated monitoring processes, or both, when novel data is added to a particular Data Table in a database by including such notification in the step where the new reference hash is added to the Reference Table. By adding a step checking an existing reference hash (or if preferred, an existing reference value) for associations with the Data Table the new data is being added to, it is also trivial to monitor individual Data Tables for the addition of data which is novel to the individual Data Table.
2) If, for example, the invention is being used to monitor a table of unique IP addresses visiting a marketing website, if a value is added to a selected table, the DBMS can be configured such that the check for the existence of a unique reference hash (or if preferred, reference value) will also perform a secondary step notifying any and all human users desired via email (or other messaging means) that a reference hash (or if preferred, reference value) has been generated which associates a new access table entry with a new potential marketing opportunity.
3) Similarly, if the invention is being used to monitor a table of unique IP addresses visiting a marketing website, if a value is added to a unique visitor table, the DBMS can be configured such that the check for the existence of a unique reference hash (or if preferred, reference value) will also perform a secondary step sending automated monitoring processes or systems that a reference hash (or if preferred, reference value) has been generated which associates a new access table entry with a new marketing opportunity.
4) To expand on the above examples, after a notification is sent to a human being and/or an automated monitoring process or system when a new correlation appears, the method may extend to either manual responses (on the part of a human being) or automatic responses (on the part of an automated monitoring process or system) which initiate predefined protocols or methods, such as searching for a known email address associated with a new IP address and forwarding additional marketing information.

Figure 5:
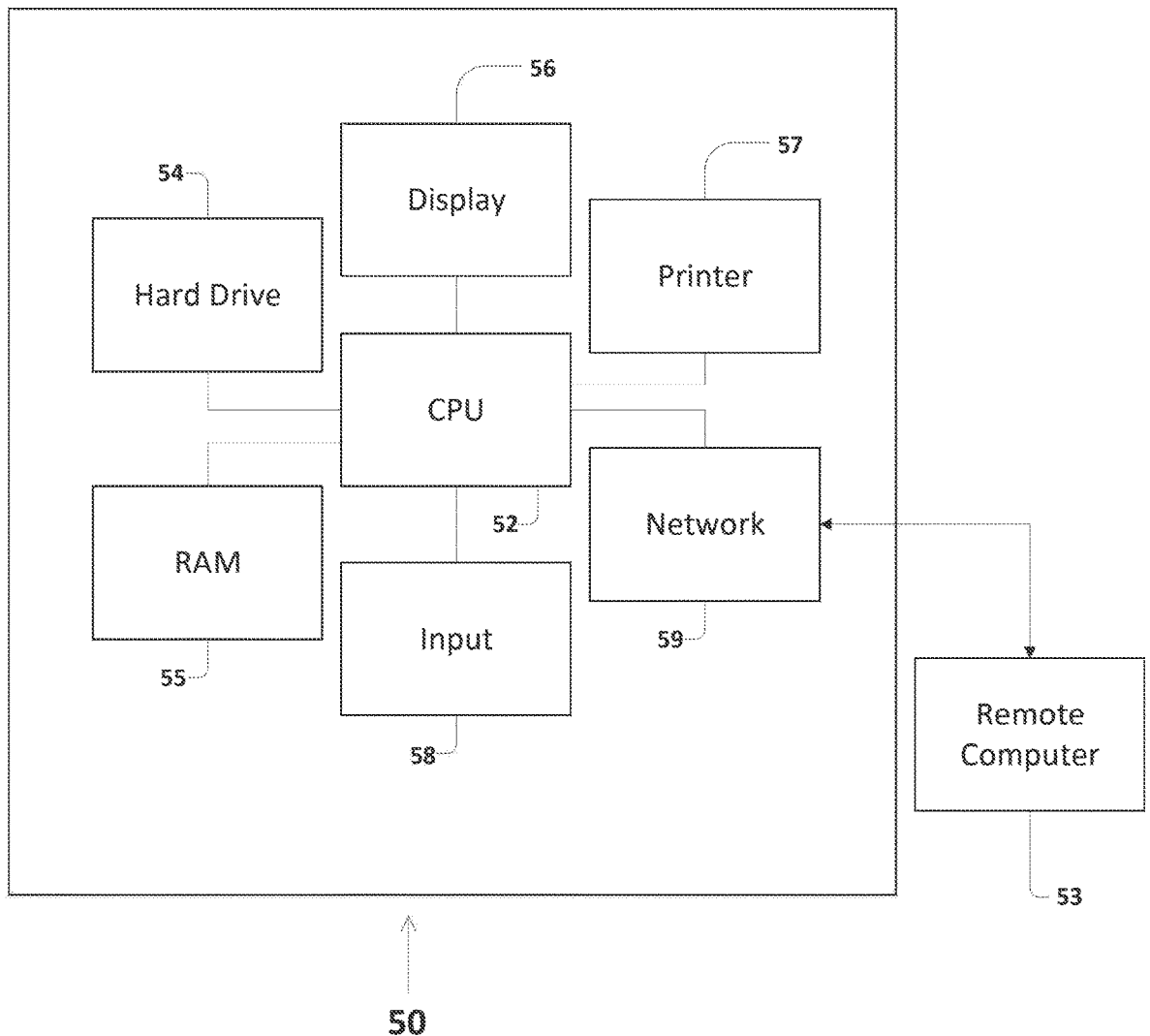
FIG. 5 depicts a structure diagram of a digital computer device which can embody the invention.

While the method may be implemented in any reasonable way, FIG. 5 depicts a device which implements the method such that a person of reasonable skill in the art could use such a device to automate part or all of the method.

Computer 50 comprises CPU 52, which executes instructions (such as the computer code for implementing a DBMS) stored in digital files. These files are stored in a persistent storage device such as Hard Drive 54, which can be a mechanical hard drive, a Flash RAM, or any other desired persistent storage device. They are read into RAM 55 by CPU 52, which obtains data stored in a database similarly contained in Hard Drive 54. A user inputs search commands, additional data, or other relevant input through Input Device 58, which can comprise a keyboard, a mouse, a scanner, a voice recognition unit, or any combination of these or other equivalent input means. Information stored on Hard Drive 54, along with interface screens and output information, can be displayed to the user on Display 56, which can comprise a CRT, an LED or LCD, or any other reasonable display means. In addition or alternatively, information can be provided by physical means such as Printer 57.

It is optional to store any part of the DBMS, including code, client application interfaces, server application interfaces, Data Tables or Reference Tables, remotely, for example in Remote Computer 53, which may be connected to Computer 50 via Network 59. Network 59 can comprise physical networking or cabling, wireless networking, or virtual networking through the global computer network.

As an example, and without limitation, a DBMS as described generally in FIG. 5 could include a Relational Object Engine and a Relational Lookup Engine. The Relational Object Engine creates, updates, and deletes a Reference Table (or Reference Tables) as necessary to track the relationships between disparate data stored in Data tables for various unique values and to provide the necessary information to retrieve the desired data. The Relational Lookup Engine can efficiently locate and retrieve document objects described by queries, optionally filtering the result set before retrieval and providing the results to the client.

In a preferred embodiment, the DBMS includes a Relational Organization Engine, a Relational Lookup Engine, an API, and a data storage system. The Relational Organization Engine examines Data tables and creates Reference Tables objects to describe relationships between data objects that vary in type but contain matching values or overlapping values, such as numeric ranges. The Reference Tables include the information necessary for the DBMS to retrieve the original data objects by means of searching the Data Tables which contain them. The Relational Lookup Engine processes search values to find matching reference values, finds all Data Tables which contain the reference value(s) corresponding to the search value, and then optionally retrieves and/or processes the values stored in the Data Tables.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure. Because of this disclosure and solely because of this disclosure, modification of this device and method can become clear to a person having ordinary skill in this particular art. Such modifications are clearly covered by this disclosure.

What is claimed is:

1. A method for managing data in a non-relational database over a network, wherein one or more processors execute instructions to perform actions, comprising:
   providing access to a plurality of data tables that include a plurality of key values in the non-relational database;
   generating an index table that includes one or more index records in the non-relational database, wherein each index record includes one key value and a list of each name for each data table that includes the same one key value, wherein each key value that corresponds to each index record is different than another key value that corresponds to another index record;
   generating a stitch object table that includes one or more stitch objects in the non-relational database, wherein each stitch object includes the one key value and a name of each permutation of each listed data table that includes the same one key value and a column for a location of the same one key value in each of the listed data tables;
   generating a stitch map table that includes one or more stitch map objects in the non-relational database, wherein each stitch map object includes the one key value and the name of each of the listed data tables that includes the same one key value and a row for the location of the same one key value in each of the listed data tables; and
   receiving information for searching the plurality of data tables in the non-relational database, wherein further actions are performed, including:
      when the information includes one or more of the plurality of key values that are included in the one or more index records, employing the one or more stitch objects and the one or more stitch map objects to prioritize a particular search that provides an improved result with a lower number of required operations for the one or more key values included in the information based on a determination of the column and the row of each location of each key value in each of the listed data tables in the non-relational database that is the same as the one or more key values included in the information; and
      providing a response to the received information, wherein the response includes the results for the column and the row for each location of each key value in each of the listed data tables in the non-relational database.

2. The method of claim 1, further comprising:
   when the received information includes one or more new key values that are non-included in the one or more index records, generating one or more new index records that include the one or more new key values, wherein each new index record includes one new key value and a new list of each name for each data table that includes the same one new key value, and wherein each new key value that corresponds to each new index record is different than another new key value that corresponds to another new index record.

3. The method of claim 1, further comprising:
   when the received information includes one or more new key values that are non-included in the one or more index records, updating the stitch object table to include one or more new stitch objects, wherein each new stitch object includes one new key value and a name of each data table that includes the same one new key value and a column for a location of the same one new key value in each data table that includes the same one new key value.

4. The method of claim 1, further comprising:
   when the received information includes one or more new key values that are non-included in the one or more index records, updating the stitch map table to include one or more new stitch map objects, wherein each new stitch map object includes one new key value and a name of each data table that includes the same one new key value and a row for a location of the same one new key value in each data table that includes the same one new key value.

5. The method of claim 1, further comprising:
   searching the one or more index records to determine when the received information includes the one or more of the plurality of key values.

6. The method of claim 1, further comprising:
   searching the one or more index records to determine when the received information that includes the one same key value is also included in more than one listed data table.

7. The method of claim 1, wherein the plurality of data tables, further comprises:
   a first data table comprising a plurality of first data table records in the non-relational database, the plurality of first data table records comprising a plurality of first data table fields, the plurality of first data table fields having a plurality of associated first data table field names and the plurality of first data table fields storing a plurality of first data table field values;
   a second data table comprising a plurality of second data table records in the non-relational database, the plurality of second data table records comprising a plurality of second data table fields, the plurality of second data table fields having a plurality of associated second data table field names and the plurality of second data table fields storing a plurality of second data table field values; and
   a third data table comprising a plurality of third data table records in the non-relational database, the plurality of third data table records comprising a plurality of third data table fields, the plurality of third data table fields having a plurality of associated third data table field names and the plurality of third data table fields storing a plurality of third data table field values.

8. A computer for managing data in a non-relational database over a network, wherein one or more processors execute instructions to perform actions, comprising:
  providing access to a plurality of data tables that include a plurality of key values in the non-relational database;
  generating an index table that includes one or more index records in the non-relational database, wherein each index record includes one key value and a list of each name for each data table that includes the same one key value, wherein each key value that corresponds to each index record is different than another key value that corresponds to another index record;
  generating a stitch object table that includes one or more stitch objects in the non-relational database, wherein each stitch object includes the one key value and a name of each permutation of each listed data table that includes the same one key value and a column for a location of the same one key value in each of the listed data tables;
  generating a stitch map table that includes one or more stitch map objects in the non-relational database, wherein each stitch map object includes the one key value and the name of each of the listed data tables that includes the same one key value and a row for the location of the same one key value in each of the listed data tables; and
  receiving information for searching the plurality of data tables in the non-relational database, wherein further actions are performed, including:
    when the information includes one or more of the plurality of key values that are included in the one or more index records, employing the one or more stitch objects and the one or more stitch map objects to prioritize a particular search that provides an improved result with a lower number of required operations for the one or more key values included in the information based on a determination of the column and the row of each location of each key value in each of the listed data tables in the non-relational database that is the same as the one or more key values included in the information; and
    providing a response to the received information, wherein the response includes the results for the column and the row for each location of each key value in each of the listed data tables in the non-relational database.

9. The computer of claim 8, further comprising:
  when the received information includes one or more new key values that are non-included in the one or more index records, generating one or more new index records that include the one or more new key values, wherein each new index record includes one new key value and a new list of each name for each data table that includes the same one new key value, and wherein each new key value that corresponds to each new index record is different than another new key value that corresponds to another new index record.

10. The computer of claim 8, further comprising:
  when the received information includes one or more new key values that are non-included in the one or more index records, updating the stitch object table to include one or more new stitch objects, wherein each new stitch object includes one new key value and a name of each data table that includes the same one new key value and a column for a location of the same one new key value in each data table that includes the same one new key value.

11. The computer of claim 8, further comprising:
  when the received information includes one or more new key values that are non-included in the one or more index records, updating the stitch map table to include one or more new stitch map objects, wherein each new stitch map object includes one new key value and a name of each data table that includes the same one new key value and a row for a location of the same one new key value in each data table that includes the same one new key value.

12. The computer of claim 8, further comprising:
  searching the one or more index records to determine when the received information includes the one or more of the plurality of key values.

13. The computer of claim 8, further comprising:
  searching the one or more index records to determine when the received information that includes the one same key value is also included in more than one listed data table.

14. The computer of claim 8, wherein the plurality of data tables, further comprises:
  a first data table comprising a plurality of first data table records in the non-relational database, the plurality of first data table records comprising a plurality of first data table fields, the plurality of first data table fields having a plurality of associated first data table field names and the plurality of first data table fields storing a plurality of first data table field values;
  a second data table comprising a plurality of second data table records in the non-relational database, the plurality of second data table records comprising a plurality of second data table fields, the plurality of second data table fields having a plurality of associated second data table field names and the plurality of second data table fields storing a plurality of second data table field values; and
  a third data table comprising a plurality of third data table records in the non-relational database, the plurality of third data table records comprising a plurality of third data table fields, the plurality of third data table fields having a plurality of associated third data table field names and the plurality of third data table fields storing a plurality of third data table field values.

15. A processor readable non-transitory storage device that includes instructions for managing data in a non-relational database over a network, wherein execution of the instructions by one or more processors performs actions, comprising:
  providing access to a plurality of data tables that include a plurality of key values in the non-relational database;
  generating an index table that includes one or more index records in the non-relational database, wherein each index record includes one key value and a list of each name for each data table that includes the same one key value, wherein each key value that corresponds to each index record is different than another key value that corresponds to another index record;
  generating a stitch object table that includes one or more stitch objects in the non-relational database, wherein each stitch object includes the one key value and a name of each permutation of each listed data table that includes the same one key value and a column for a location of the same one key value in each of the listed data tables;
  generating a stitch map table that includes one or more stitch map objects in the non-relational database, wherein each stitch map object includes the one key value and the name of each of the listed data tables that includes the same one key value and a row for the location of the same one key value in each of the listed data tables; and receiving information for searching the plurality of data tables in the non-relational database, wherein further actions are performed, including:

when the information includes one or more of the plurality of key values that are included in the one or more index records, employing the one or more stitch objects and the one or more stitch map objects to prioritize a particular search that provides an improved result with a lower number of required operations for the one or more key values included in the information based on a determination of the column and the row of each location of each key value in each of the listed data tables in the non-relational database that is the same as the one or more key values included in the information; and providing a response to the received information, wherein the response includes the results for the column and the row for each location of each key value in each of the listed data tables in the non-relational database.

16. The processor readable non-transitory storage device of claim 15, wherein execution of the instructions by the one or more processors performs further actions, comprising:

when the received information includes one or more new key values that are non-included in the one or more index records, generating one or more new index records that include the one or more new key values, wherein each new index record includes one new key value and a new list of each name for each data table that includes the same one new key value, and wherein each new key value that corresponds to each new index record is different than another new key value that corresponds to another new index record.

17. The processor readable non-transitory storage device of claim 15, wherein execution of the instructions by the one or more processors performs further actions, comprising:

when the received information includes one or more new key values that are non-included in the one or more index records, updating the stitch object table to include one or more new stitch objects, wherein each new stitch object includes one new key value and a name of each data table that includes the same one new key value and a column for a location of the same one new key value in each data table that includes the same one new key value.

18. The processor readable non-transitory storage device of claim 15, wherein execution of the instructions by the one or more processors performs further actions, comprising:

when the received information includes one or more new key values that are non-included in the one or more index records, updating the stitch map table to include one or more new stitch map objects, wherein each new stitch map object includes one new key value and a name of each data table that includes the same one new key value and a row for a location of the same one new key value in each data table that includes the same one new key value.

19. The processor readable non-transitory storage device of claim 15, wherein execution of the instructions by the one or more processors performs further actions, comprising:

searching the one or more index records to determine when the received information includes the one or more of the plurality of key values.

20. The processor readable non-transitory storage device of claim 15, wherein execution of the instructions by the one or more processors performs further actions, comprising:

searching the one or more index records to determine when the received information that includes the one same key value is also included in more than one listed data table.

* * * * *